US006778200B2

(12) United States Patent
Hann

(10) Patent No.: US 6,778,200 B2
(45) Date of Patent: Aug. 17, 2004

(54) THERMAL TRANSFER PRINTER, DYESHEET AND METHOD OF OPERATION

(75) Inventor: Richard Anthony Hann, Ipswich (GB)

(73) Assignee: Keith W. Nash & Co., Cambridge (GB)

( * ) Notice: Subject to any disclaimer, the term of this patent is extended or adjusted under 35 U.S.C. 154(b) by 0 days.

(21) Appl. No.: 10/466,677

(22) PCT Filed: Jan. 23, 2002

(86) PCT No.: PCT/GB02/00277

§ 371 (c)(1), (2), (4) Date: Nov. 3, 2003

(87) PCT Pub. No.: WO02/062584

PCT Pub. Date: Aug. 15, 2002

(65) Prior Publication Data

US 2004/0061766 A1 Apr. 1, 2004

(30) Foreign Application Priority Data

Feb. 7, 2001 (GB) ............................................ 0102991

(51) Int. Cl.[7] ............................ G41J 35/16; G01J 3/46; G06K 7/10; G06K 7/12

(52) U.S. Cl. ........................................ 347/178; 347/217

(58) Field of Search ................................ 347/178, 217; 400/240.3, 240.4; 356/425

(56) References Cited

U.S. PATENT DOCUMENTS

2002/0001084 A1 * 1/2002 Yokozawa et al. .......... 356/425

FOREIGN PATENT DOCUMENTS

| | | |
|---|---|---|
| EP | 60019563 | 1/1985 |
| EP | 60131286 | 7/1985 |
| EP | 63288761 | 11/1988 |
| FR | 2 716 412 | 8/1995 |

* cited by examiner

*Primary Examiner*—Huan Tran
(74) *Attorney, Agent, or Firm*—Morgan, Lewis & Bockius LLP

(57) ABSTRACT

A thermal transfer printer includes three light emitting diodes (7, 8, 9) emitting red, green and blue light respectively, and respective detectors (10, 11, 12) mounted on the opposite side of a dyesheet (1) passing through the printer. The detectors (10, 11, 12) detect the light absorption ratios of three colour print panels (Y, M and C) of the dyesheet, and these detected ratios are compared with acceptable ranges of light absorption ratios. If the detected light absorption ratio for any colour falls outside the corresponding range, use or further use of the dyesheet in the printer is prevented, for example by disabling an essential function of the printer or ejecting the dyesheet from the printer.

14 Claims, 4 Drawing Sheets

THERMAL TRANSFER PRINTER, DYESHEET AND METHOD OF OPERATION

FIELD OF THE INVENTION

This invention relates to thermal transfer printers, dyesheets therefor and methods of operation thereof.

SUMMARY OF THE INVENTION

According to one aspect of the invention there is provided a thermal transfer printer including detector means for detecting a light absorption characteristic of a thermal transfer dyesheet inserted in the printer, comparison means for comparing the detected light absorption characteristic with an acceptable light absorption characteristic and rejection means for preventing use or further use of the dyesheet in the printer if the detected light absorption characteristic fails to conform to the acceptable light absorption characteristic.

The detector means may be operative to detect the light absorption characteristic of one colour only of a multicolour dyesheet, but to improve discrimination the detector means is preferably operative to detect the respective light absorption characteristics of more than one colour, the rejection means then preventing use or further use of the dyesheet if the detected light absorption characteristic of any one colour fails to conform to the acceptable light absorption characteristic for that colour. For each colour detected, the detector means preferably comprises a light source of a frequency appropriate to the colour to be detected and a detector which produces an electrical output signal representative of the attenuation of the light as a result of passage of the light through the colour of the dyesheet. The light source and detector may be on opposite sides of the plane of dyesheet movement through the printer or may be on the same side, the light then being transmitted a first time through the dyesheet, being reflected and then being transmitted a second time through the dyesheet. It is also possible to obtain further discrimination by measuring the light absorption characteristic of a black or overlay panel of the dyesheet.

Preferably, the detected light absorption characteristic is a magnitude of light absorption and the acceptable light absorption characteristic is a range of light absorption values, the rejection means then preventing use or further use of the dyesheet in the printer if the detected light absorption magnitude falls outside the acceptable range. It is convenient to quantify the absorption magnitude by taking the ratio of the detector output with the dye panel in place to the detector output on a clear portion of the dyesheet.

It is also possible for the light absorption characteristic to be the magnitude of optical density, where optical density has its conventional definition of $\log_{10}(I_0/I)$, in which $I_0$ is the intensity of the incident light and $I$ is the intensity of the transmitted light.

The rejection means may operate in any one of a number of ways. For example, the rejection means could prevent use or further use of the dyesheet by disabling an essential function of the printer such as dyesheet transport or operation of the print head, or the rejection means could eject the dyesheet from the printer, this being most practicable if the dyesheet is carried in a cassette or cartridge. In each case, the printer could produce an audible signal and/or a visual indication to the user that the dyesheet is not acceptable.

According to another aspect of the invention there is provided a method of determining the acceptability of a thermal transfer dyesheet in a thermal transfer printer, the method comprising determining a light absorption characteristic of the dyesheet, comparing the detected light absorption characteristic with an acceptable light absorption characteristic and preventing use or further use of the dyesheet in the printer if the detected light absorption characteristic fails to conform to the acceptable light absorption characteristic.

The light absorption characteristic may be determined by determining the intensity of light (of a chosen frequency) transmitted by a colour print panel of the dyesheet.

The dyesheet is normally fed from material wound up on a spool and is taken up after use on a second spool. In order to interrogate the successive panels of a dyesheet, it should desirably be wound past the detectors. Three possibilities are:

(i) After the dyesheet has been loaded into the printer, part of the installation procedure (eg closing the lid of the printer) triggers the detection process, which is carried out by winding forwards through a complete sequence, thus wasting one repeat unit of the dyesheet. This may not be of great consequence if there are several hundred repeats on the dyesheet spool. It does, however, mean that only a single check is made at the beginning, and subsequent panels could be out of specification.

(ii) After the dyesheet has been loaded, and at certain other times, the dyesheet is wound forwards to confirm its identity, and then wound back again, so that none is wasted. This would be a relatively slow process because of the need to wind the dyesheet in both directions.

(iii) Printing is carried out as normal, while simultaneously monitoring the light absorption of the dyesheet. If the dyesheet is inappropriate, the print cycle is aborted. This is potentially the simplest method to use, and in the event that the wrong dyesheet is used would limit wasted material to one unit of dyesheet and receiver.

Instead of interrogating colour print panels of the dyesheet, the intensity of light transmitted through a sample colour area on the dyesheet, corresponding to a colour print panel, may be determined in order to derive the light absorption characteristic. Preferably, these sample areas are interrogated by the printer before commencing printing, avoiding any additional winding or rewinding.

According to a yet further aspect of the invention there is provided a thermal transfer dyesheet for use in a thermal transfer printer, the dyesheet comprising colour print panels arranged in series along the length of the dyesheet, the colour print panels being arranged in repeating groups with each group comprising print panels of three different colours, between each group there being three sample colour areas spaced across the width of the dyesheet and corresponding in colour to the three colours of the print panels. The three different colours may be yellow, magenta and cyan, and there may also be a registration mark between each group of colour print panels.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
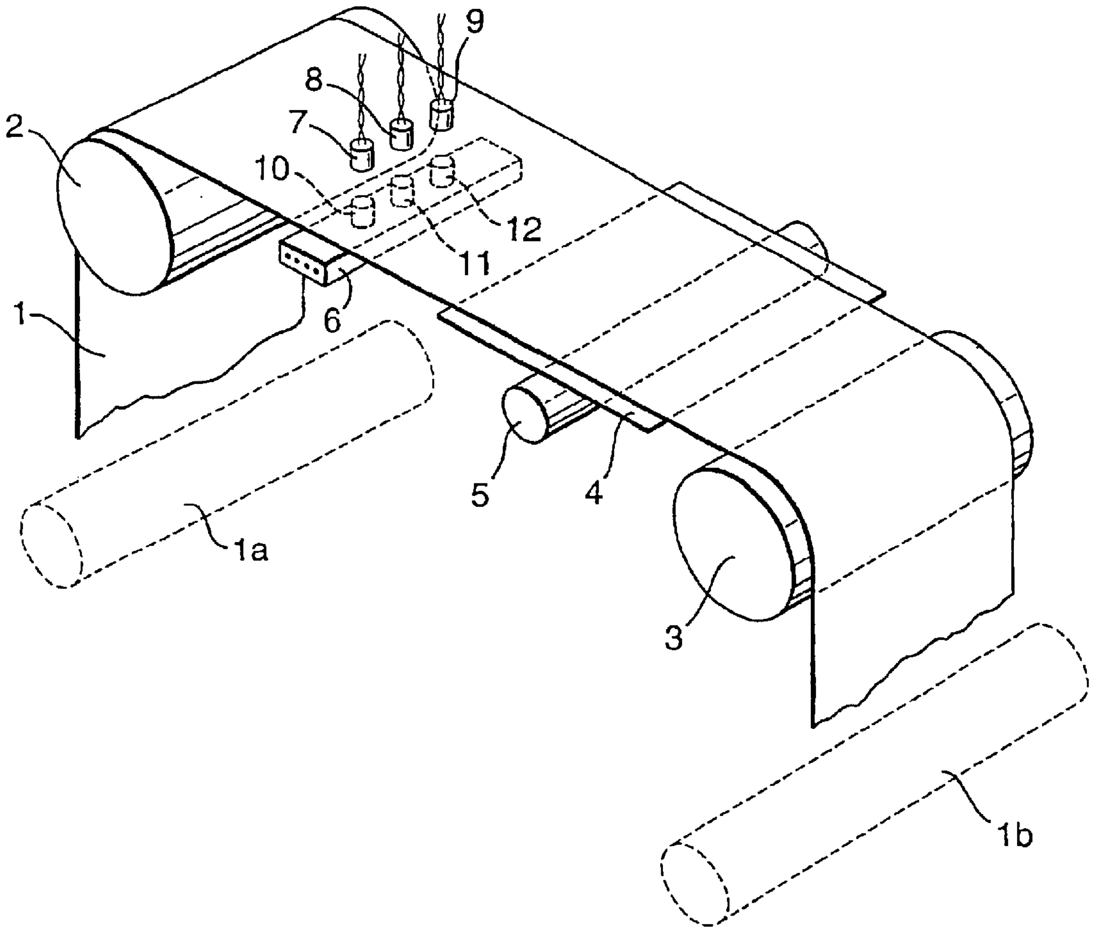
FIG. 1 shows part of a thermal transfer printer forming one embodiment of the invention.

Referring to FIG. 1, the printer has two spaced rollers 2, 3 for guiding a dyesheet 1 in its passage from a supply reel 1*a* to a take-up reel 1*b*. The dyesheet 1 passes between a roller 5 and a thermal print head, not shown. In use, a receiver sheet 4 (e.g. paper or card) is positioned between the roller 5 and the dyesheet 1 to receive an image printed on the sheet 4 by activation of the print head which is in use pressed against the dyesheet 1.

The printer also comprises detector means comprising three light sources in the form of light emitting diodes 7, 8, 9 emitting red, green and blue light, and respective detectors 10, 11, 12 mounted in a block 6. The light emitting diodes 7, 8, 9 are positioned above the plane of transport of the dyesheet 1 through the printer, and the detectors 10, 11, 12 are positioned below the plane of transport of the dyesheet 1. The three light emitting diodes 7, 8, 9 produce light having respective wavelengths of 620 an, 525 nm and 430 nm. The light emitting diodes 7, 8, 9 are spaced in a direction across the width of the dyesheet 1, and each source 7, 8, 9 is positioned directly above a corresponding detector 10, 11, 12.

Figure 2:
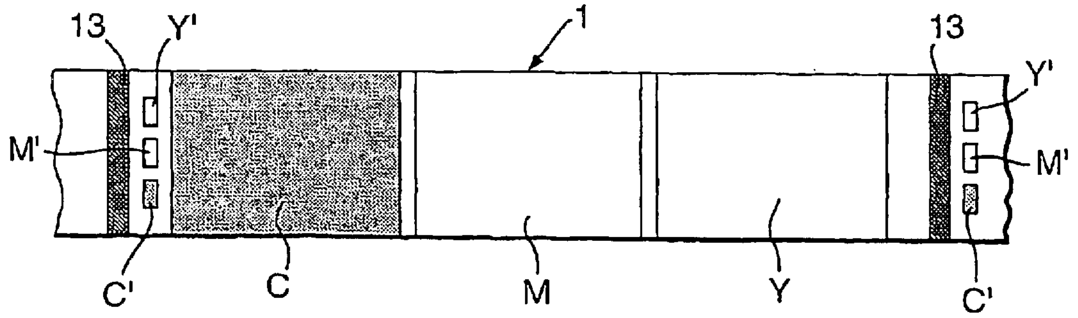
FIG. 2 shows a part of the length of a dyesheet for use in the printer of FIG. 1.

A representative length of dyesheet 1 is shown in FIG. 2. The dyesheet 1 has colour print panels of yellow (Y) magenta (M) and cyan (C) arranged in series along the length of the dyesheet 1. This group of three colour print panels repeats along the length of the dyesheet, and between each group there is a transverse registration mark 13 and three sample areas Y', M' and C' spaced across the width of the dyesheet and corresponding to the yellow Y, magenta M and cyan C colour print panels. Thus, there are three sample colour areas which respectively correspond in colour and print density to the yellow magenta and cyan print panels of the dyesheet.

When the dyesheet 1 is located in the printer and transported to the appropriate position, red light from the source 7 passes through the sample area C' and is detected by the detector 10, so that the electrical output of the latter is representative of the extent of attenuation, and therefore light absorption, of the sample area C' and thus of the print panel C. Similarly, green light from the source passes 8 through the sample area M' and is detected by the detector 11 so that the electrical output from the latter is representative of the extent of attenuation, and therefore light absorption, of the sample area M' and thus of the panel M. The same considerations apply to the source 9, the detector 12, the sample area Y' and the print panel Y. Thus, the electrical signals from the three detectors 10, 11 and 12 are representative of the light absorption values of the three colour print panels C, M and Y respectively.

Figure 3:
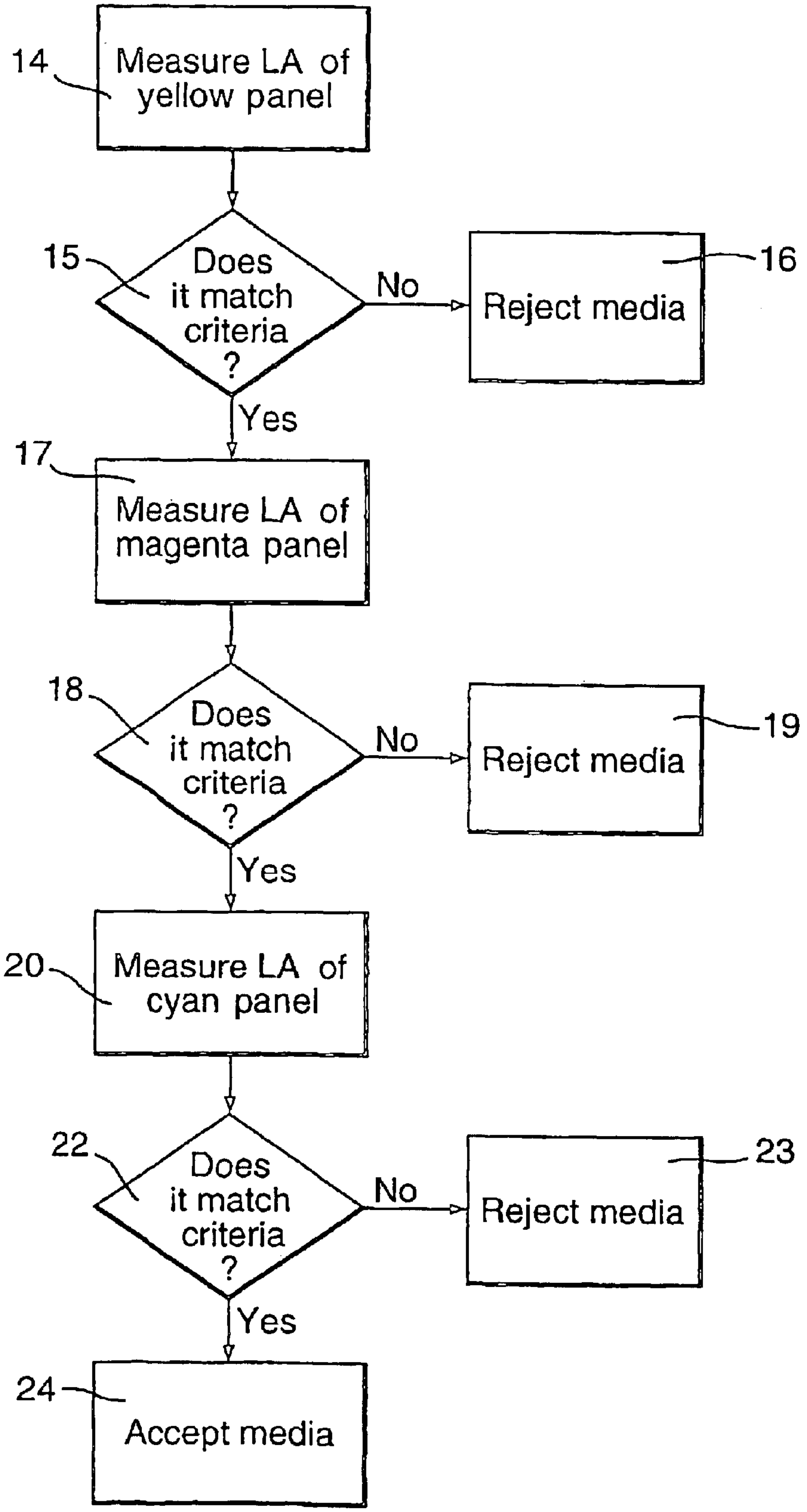
FIG. 3 is a logic diagram showing operation of the printer of FIG. 1.

FIG. 3 illustrates how the signals from the detectors 10, 11 and 12 are processed in the printer. The magnitude of the signal from the detector 12 is used to compute the light absorption ratio of the yellow print panel Y, as indicated at 14 in FIG. 3. The light absorption ratio is the magnitude of light intensity transmitted through a colour print panel divided by light intensity transmitted through a clear area of the dyesheet. This light absorption ratio is fed to comparator means which are pre-programmed with an acceptable range of light absorption ratio, in this case 0.08 to 0.12 and preferably 0.09 to 0.11. In the comparator means, the detected light absorption ratio of the yellow print panel Y is compared (as indicated at 15) with the acceptable range. If the detected light absorption ratio of the yellow print panel Y falls outside the acceptable range, the dyesheet is rejected, as indicated at 16. If the light absorption ratio of the yellow print panel Y is acceptable, the method proceeds by measuring (at 17) the light absorption ratio of the magenta panel M, by reference to the signal from the detector 11. In the comparison step 18, the light absorption ratio of the magenta panel M is compared with the acceptable range of 0.04 to 0.08, and preferably 0.05 to 0.07. The dyesheet is rejected, as indicated at 19 if the detected light absorption ratio falls outside the acceptable range. If the light absorption ratio of the magenta panel M is within the acceptable range, the method proceeds (step 20) by measuring the light absorption ratio of the cyan panel C, by reference to the signal from the detector 10. In the comparison step 22 the light absorption ratio of the cyan panel C is compared with the acceptable range of 0.015 to 0.04, preferably 0.022 to 0.034. If the dyesheet fails to conform, it is rejected, step 23. This rejection may involve ejection from the printer of the cassette holding the supply reel 1*a* and the take-up reel 1*b*. If the light absorption ratio of the cyan panel C is within the acceptable range, the dyesheet is accepted (step 24), having then satisfied the criteria for absorption ratios of all three print panels. Printing by use of the accepted dyesheet can then proceed.

Those skilled in the art will recognise that the absorption ratios at the absorption maximum translate to higher values at wavelengths slightly removed from the maximum, and will depend on the broadness of the emission band of the light source. It may be desirable to use such other wavelengths, either because of the availability of a suitable light source, or in order to reduce the attenuation caused by the dyesheet. The important factor is to match the printer recognition pattern to the optical properties of dyesheets that are within the acceptable specification. It will also be recognised that, although light emitting diodes provide convenient narrow-band sources, they often produce a further output band in the infrared region of the spectrum. For this reason it is highly desirable to use a detector which is insensitive to the infrared, as otherwise the discrimination is lost. It will also be recognised that it may be convenient to use a single detector with multiple light sources directed towards it. The sources can be switched on in turn in order to provide a sequential interrogation of the different colours.

Alternatively, it is possible to employ a broadband light source with multiple wavelength-selective detectors.

Figure 4:
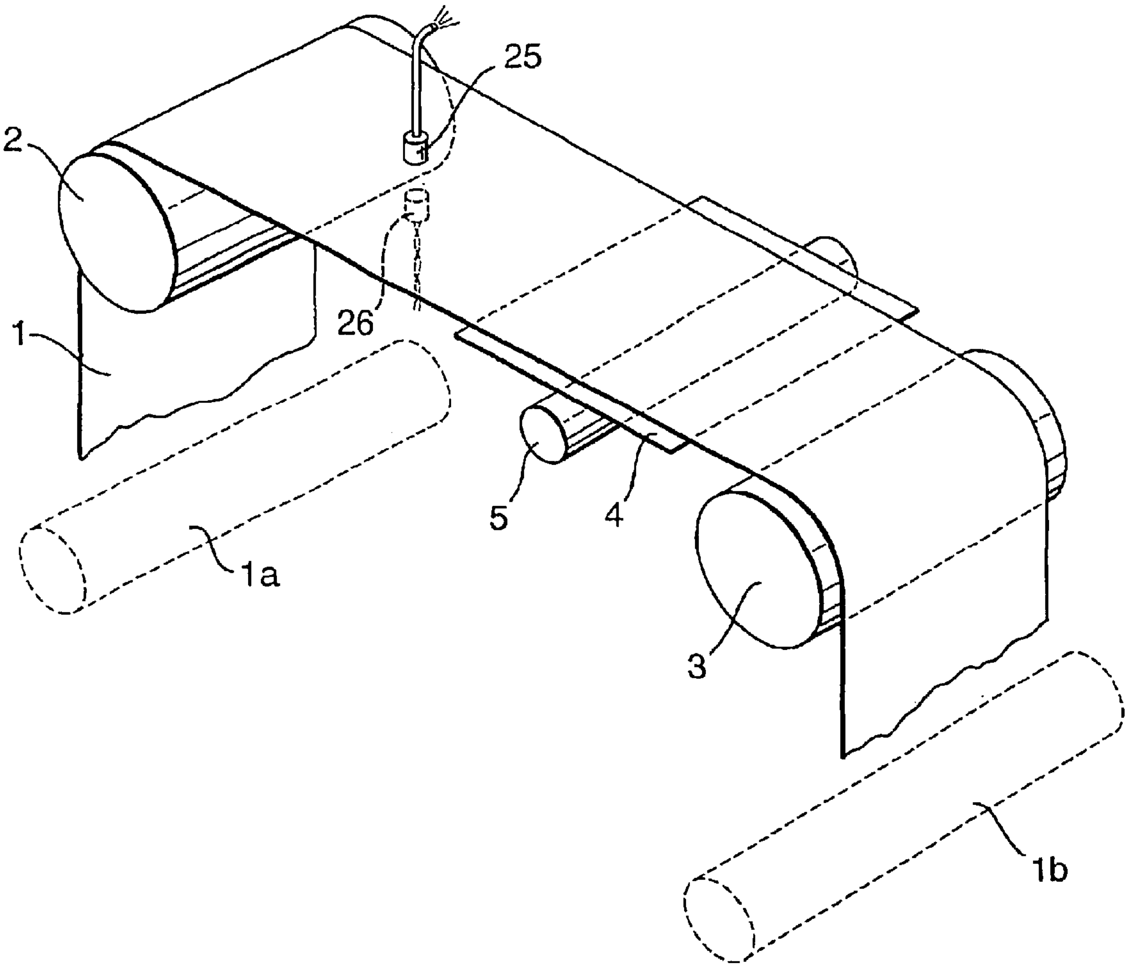
FIG. 4 shows part of a thermal transfer printer forming another embodiment of the invention.
Figure 5:
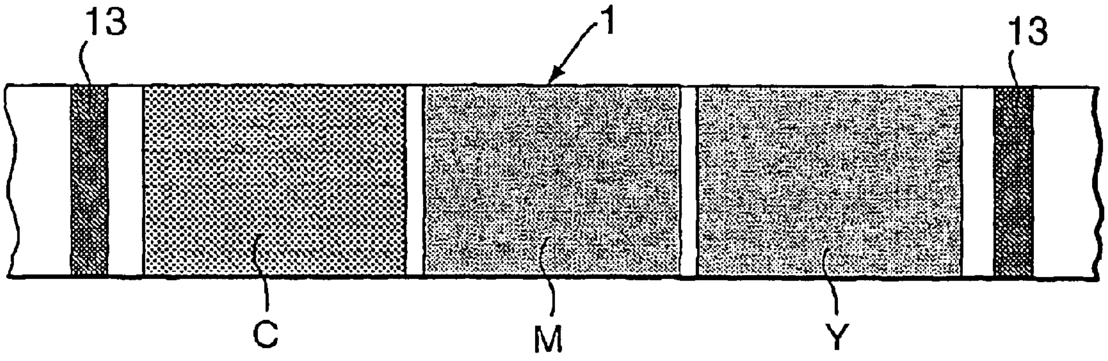
FIG. 5 shows a part of the length of a dyesheet for use in the printer of FIG. 4.

In FIGS. 4 and 5, parts corresponding to those of FIGS. 1 and 2 bear the same reference numerals. The printer of FIG. 4 differs from the printer of FIG. 1 in that the printer of FIG. 4 is designed to detect light attenuation through the colour print panels of a dyesheet, not through sample colour areas. The printer of FIG. 4 has a composite light source 25 positioned above the plane of movement of the dyesheet 1 through the printer, and a single detector 26 positioned below the plane of movement of the dyesheet 1, the detector 26 being aligned with the composite light source 25 so that the detector 26 detects light from the source 25 after attenuation as a consequence of passing through the dyesheet 1.

The composite light source 25 has three individual light sources, respectively producing light having wavelengths of 620 nm, 525 nm and 430 nm corresponding to the colours produced by the three diodes 7, 8 and 9 of FIG. 1. The detector 26 is sensitive to light at each of these three wavelengths. Alternatively, three individual detectors (like detectors 10, 11 and 12) can be grouped in a single composite detector positioned below the plane of movement of the dyesheet 1 through the printer.

The printer of FIG. 4 assesses the acceptability of a conventional dyesheet, a portion of which is illustrated in FIG. 5. This dyesheet differs from the dyesheet shown in FIG. 2 in that it is devoid of the sample areas Y', M' and C'.

When the dyesheet 1 of FIG. 5 is inserted in the printer of FIG. 4, the dyesheet is initially advanced to a first index position at which the first yellow colour print panel Y is interposed between the composite source 25 and the detector 26, so that the electrical signal from the detector 26 is representative of the light absorption value of the yellow colour print panel Y. The dyesheet 1 is then sequentially advanced to second and third index positions at which the first magenta colour print panel M and the first cyan colour print panels C are in turn interposed between the composite light source 25 and the detector 26, so that the detector produces two further electrical signals respectively representative of the light absorption values of the colour print panels M and C.

The three signals from the detector 26 are subjected to processing in a logic sequence corresponding to the flow diagram of FIG. 3. The dyesheet 1 of FIG. 5 is thus accepted for printing if the light absorption values of all three colour print panels Y, M and C are acceptable. If not, the rejection means of the printer are operative to eject the dyesheet.

It will be appreciated that the printer of FIG. 1 could be used to assess the acceptability of a dyesheet 1 of the form shown in FIG. 5, but in this case the signals from the detectors would be produced in succession as the colour print panels Y., M and C are moved successively to their index positions.

EXAMPLE

Light was directed separately from each of three light emitting diodes (LED) towards a silicon photodiode with a built-in infrared cut-off filter (type VTB8440B, manufactured by EG&G). A voltage of 10.5 V was applied to the photodiode, which was connected in series with a 10 M Q resistor. The voltage across the resistor was recorded as a measure of the transmitted light intensity. The light absorption ratio was calculated by taking the ratio of the measured voltage with a panel of the corresponding colour in place to the measured voltage with a clear section of dyesheet in place.

Three different dyesheets were tested in this way:

| LED | Nominal Wavelength/ nm | Panel Colour | Dyesheet 1 Light Absorption Ratio | Dyesheet 2 Light Absorption Ratio | Dyesheet 3 Light Absorption Ratio |
|---|---|---|---|---|---|
| Kingbright L934SED | 620 | Cyan | 0.028 | 0.0085 | 0.001 |
| RS 249-8752 | 525 | Magenta | 0.061 | 0.035 | 0.002 |
| Kingbright L934MBD | 430 | Yellow | 0.098 | 0.161 | 0.051 |

All components were obtained from RS Components Ltd.

The acceptable ranges of light absorption ratios are 0.022 to 0.034 for cyan, 0.05 to 0.07 for magenta and 0.09 to 0.11 for yellow. Dyesheet 1 passed on all 3 panels, while dyesheets 2 and 3 failed. This example is applicable to the printer of FIG. 1 or to the printer of FIG. 4.

Figure 6:
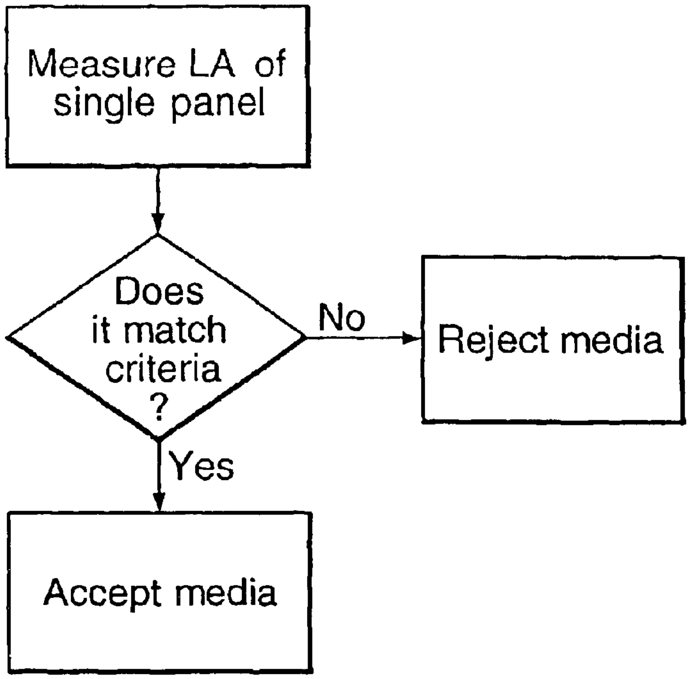
FIG. 6 shows an alternative logic diagram.

FIG. 6 represents a simpler method in which the light absorption of a single print panel is tested, the result being to accept or reject the dyesheet dependent on whether the detected light absorption is within or outside the acceptable range of light absorption pre-programmed into the printer.

The rejection of the dyesheet or ribbon prevents its use or further use in the printer, so the user is obliged to replace the rejected dyesheet or ribbon by a fresh dyesheet or ribbon which is then subjected to detection of its light absorption, as described.

What is claimed is:

1. A thermal transfer printer including detector means for detecting a light absorption characteristic of a thermal transfer dyesheet inserted in the printer, comparison means for comparing the detected light absorption characteristic with an acceptable light absorption characteristic and rejection means for preventing use or further use of the dyesheet in the printer if the detected light absorption characteristic fails to conform to the acceptable light absorption characteristic.

2. A thermal transfer printer according to claim 1, wherein the detector means is operative to detect the respective light absorption characteristics of more then one colour of a multi-colour dyesheet, the rejection means preventing use or further use of the dyesheet if the detected light absorption characteristic of any one colour fails to conform to the acceptable light absorption characteristic for that colour.

3. A thermal transfer printer according to claim 2, wherein, for each colour detected, the detector means comprises a light source of a frequency appropriate to the colour to be detected and a detector which produces an electrical output signal representative of the attenuation of the light as a result of passage of the light through the colour of the dyesheet.

4. A thermal transfer printer according to claim 3, wherein the light source and detector are positioned on mutually opposite sides of the dyesheet.

5. A thermal transfer printer according to claim 3, wherein the light source and detector are on the same side of the dyesheet, the light from the light source being transmitted through the dyesheet, being reflected and then being transmitted a second time through the dyesheet before reaching the detector.

6. A thermal transfer printer according to any one of the preceding claims, wherein the detected light absorption characteristic is a magnitude of light absorption.

7. A thermal transfer printer according to claim 6, wherein the acceptable light absorption characteristic is a range of light absorption values, the rejection means preventing use or further use of the dyesheet in the printer if the detected light absorption magnitude falls outside the acceptable range.

8. A thermal transfer printer according to any one of claims 1 to 5, wherein the detected light absorption characteristic is the magnitude of optical density, defined as $\log_{10} I_0/I$ where $I_0$ is the intensity of the incident light and I is the intensity of the transmitted light.

9. A method of determining the acceptability of a thermal transfer dyesheet in a thermal transfer printer, comprising determining a light absorption characteristic of the dyesheet, comparing the detected light absorption characteristic with an acceptable light absorption characteristic and preventing use or further use of the dyesheet in the printer if the detected light absorption characteristic fails to conform to the acceptable light absorption characteristic.

10. A method according to claim 9, wherein the light absorption characteristic is determined by detecting the intensity of light of a chosen frequency transmitted by a colour print panel of the dyesheet.

11. A method according to claim 9, wherein the intensity of light transmitted through a sample colour area on the dyesheet, corresponding to a colour print panel of the dyesheet, is determined in order to derive the light absorption characteristic.

12. A method according to any one of claims 9 to 11, wherein the light absorption characteristic is a magnitude of light absorption ratio, being the magnitude of light intensity transmitted through a colour print panel divided by light intensity transmitted through a clear area of the dyesheet.

13. A thermal transfer dyesheet for use in a thermal transfer printer, the dyesheet comprising colour print panels arranged in series along the length of the dyesheet, the colour print panels being arranged in repeating groups with each group comprising print panels of three different colours, between each group there being three sample colour areas spaced across the width of the dyesheet and corresponding in colour to the three colours of the print panels.

14. A thermal transfer dyesheet according to claim 13 and in combination with a printer according to any one of claims 1 to 8.

* * * * *